(12) United States Patent
Blair

(10) Patent No.: US 6,249,218 B1
(45) Date of Patent: Jun. 19, 2001

(54) VENTED REMOTE RADAR DETECTOR

(75) Inventor: Robert G. Blair, Cincinnati, OH (US)

(73) Assignee: Escort, Inc., Chicago, IL (US)

( * ) Notice: Subject to any disclaimer, the term of this patent is extended or adjusted under 35 U.S.C. 154(b) by 0 days.

(21) Appl. No.: 09/562,974

(22) Filed: May 3, 2000

(51) Int. Cl.[7] .................................................. B06Q 1/00
(52) U.S. Cl. ..................... 340/435; 340/901; 340/905; 340/502; 340/438; 340/447; 439/206
(58) Field of Search ..................... 340/435, 901, 340/905, 502, 438, 447; 439/206

(56) References Cited

U.S. PATENT DOCUMENTS

| H280 | * | 6/1987 | Thigpen | 429/7 |
| 4,610,256 | | 9/1986 | Wallace | 128/675 |
| 4,631,542 | * | 12/1986 | Grimsley | 342/20 |
| 4,952,937 | | 8/1990 | Allen | 342/20 |
| 5,001,777 | * | 3/1991 | Liautaud | 455/277 |
| 5,250,951 | * | 10/1993 | Valentine et al. | 342/20 |
| 5,564,951 | * | 10/1996 | Altal et al. | 439/676 |

OTHER PUBLICATIONS

Escort Inc., *Passport SR1*, (one page flyer).

* cited by examiner

*Primary Examiner*—Daniel J. Wu
*Assistant Examiner*—Tai T. Nguyen
(74) *Attorney, Agent, or Firm*—Wood Herron & Evans LLP

(57) ABSTRACT

A remote radar detector (10) includes a receiver unit (12) adapted to be mounted outside the vehicle passenger compartment (22) of a vehicle (20) and an alert unit (14) adapted to be mounted inside the vehicle passenger compartment (22), with a cable (16) electrically coupling the units (12, 14) together. Cable (16) includes a lumen (62) therethrough connected to a vent opening (75) by which to vent the interior (68) of receiver unit (12).

28 Claims, 2 Drawing Sheets

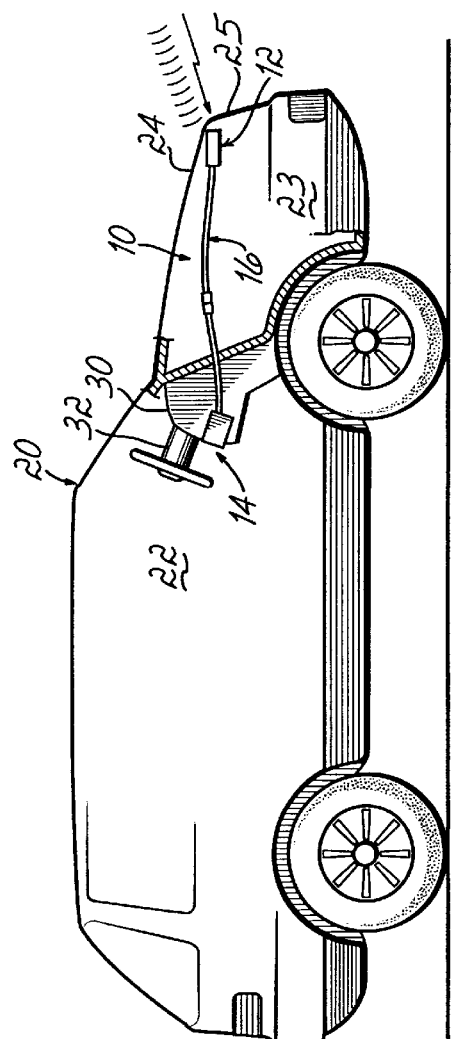
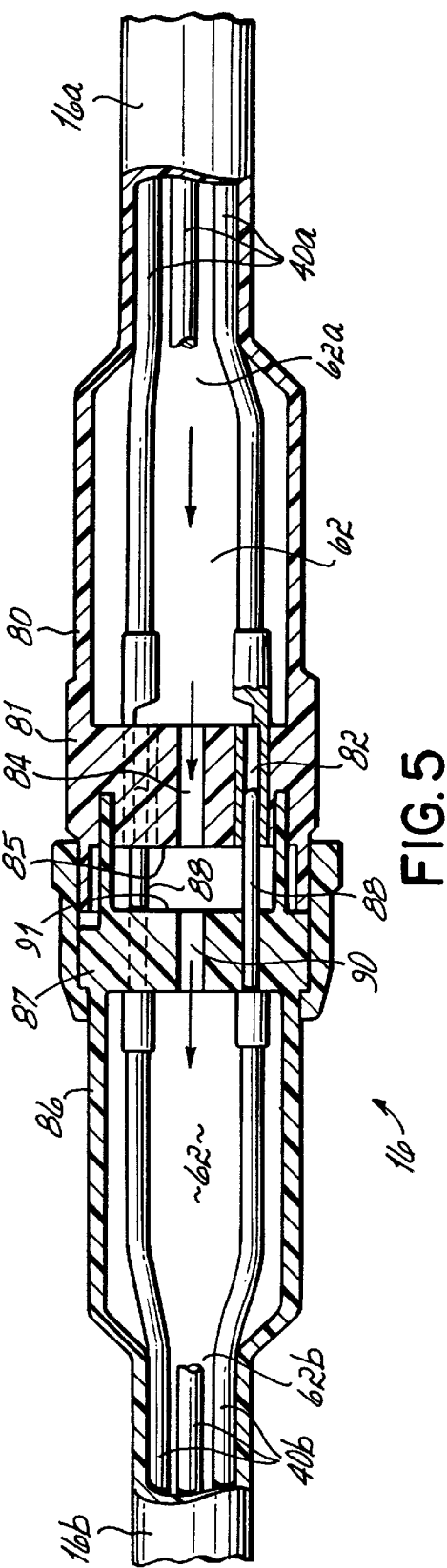

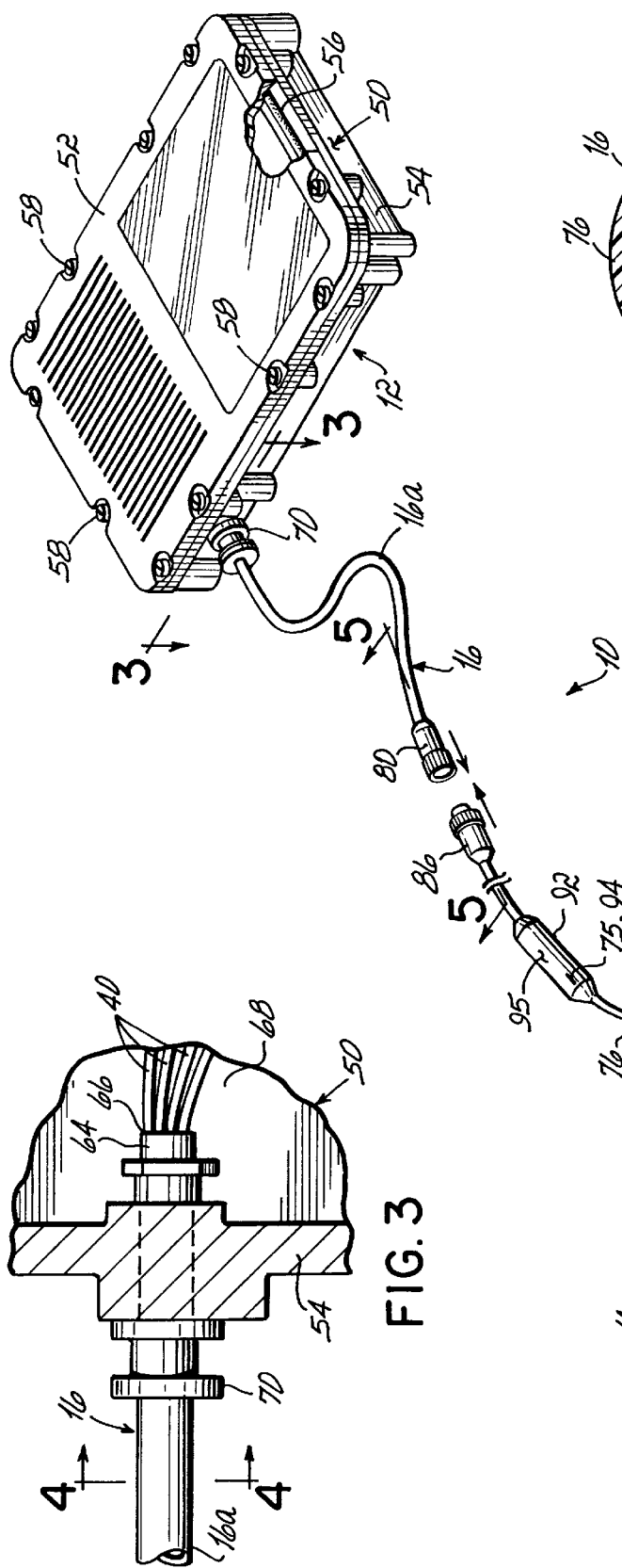
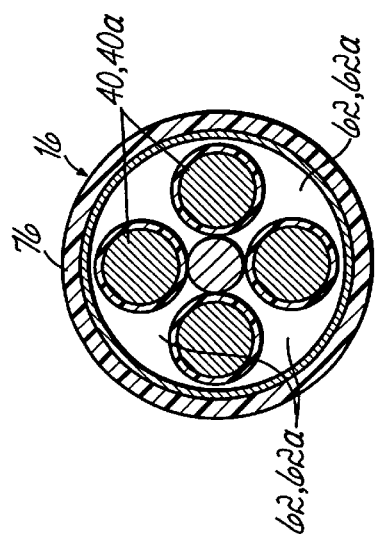
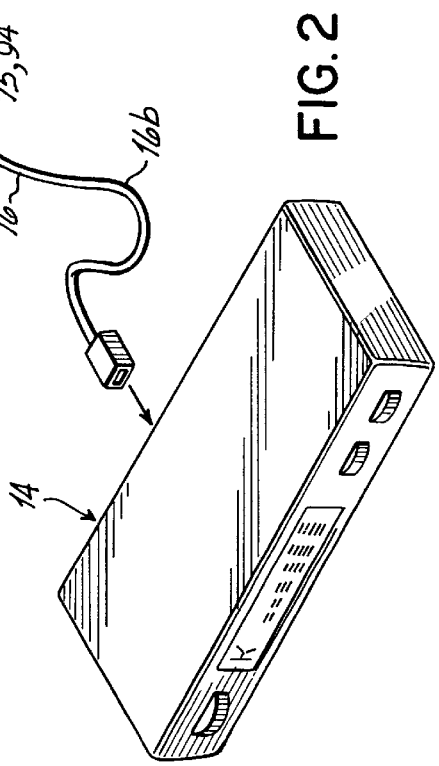
FIG. 2
FIG. 3
FIG. 4

VENTED REMOTE RADAR DETECTOR

BACKGROUND OF THE INVENTION

I. Field of the Invention

The present invention relates to radar detectors, and more particularly, to remote radar detectors in which the receiver unit is mounted outside the vehicle passenger compartment and the alert unit is mounted inside the vehicle passenger compartment to alert the driver to presence of police radar.

II. Description of Prior Art

Typical radar detectors are self-contained single units containing receiver circuitry and alert circuitry. The self-contained unit is typically mounted in the vehicle passenger compartment such as against the inside, middle of the windshield so as to detect police microwave and/or laser radar signals and to provide the driver with an audible and/or visual warning of the presence of such police radar signals. Remote radar detectors have been developed in which the receiver aspect of the detector is in a unit situated outside the vehicle passenger compartment, while the alert aspect of the detector is in a unit that continues to be mounted inside the vehicle passenger compartment. Such remote radar detectors allow for more optimal placement of the units so as to increase sensitivity of the receiver aspects of the detector and/or allow for more discreet positioning of the alert unit, such as along the dashboard or steering wheel column, instead of in the middle of the windshield. A cable or cord electrically connects the receiver unit from outside the vehicle passenger compartment to the alert unit mounted inside the vehicle passenger compartment. One example of a remote radar detector is shown in U.S. Pat. No. 4,952,937, in which the receiver portion is formed as part of a license plate frame.

While mounting of receiver units outside the vehicle passenger compartment has some advantages, it will be appreciated that the receiver unit is subject to significant environmental extremes and conditions. Thus, it has been found desirable to hennetically seal the receiver unit. Unfortunately, drastic fluctuations in temperature, for example, can cause significant changes in pressure inside the hermetically sealed unit which can cause poor performance or damage to the receiver unit. Additionally, even under the best of circumstances, there are times when the hermetic seal is simply insufficient to keep all moisture, for example, out of the receiver unit. Moreover, once the moisture invades the unit, it is difficult if not impossible for the moisture to escape from the unit thus leading in the long term to damage or failure of the receiver unit.

SUMMARY OF THE INVENTION

The present invention provides an improved remote receiver unit which is advantageously hennetically sealed but which is provided with a mechanism to alleviate temperature, pressure and/or moisture problems which might otherwise damage the receiver unit. To this end, and in accordance with the principles of the present invention, the cable or cord electrically interconnecting the receiver unit mounted outside the passenger compartment to the unit inside the vehicle compartment has a lumen or airspaces extending therethrough and which communicates atmosphere through the cable and into the interior of the receiver unit via a vent coupled to the cable lumen. The vent may be provided by an opening or slit in the cable sidewall. The vent is advantageously spaced remote from the receiver unit, such as by venting a portion of the cable which is inside the vehicle passenger compartment, so as to minimize the likelihood that contaminants would enter the receiver unit through the vented cable.

By virtue of the foregoing, there is thus provided a remote radar detector in which the receiver unit to be mounted outside the vehicle passenger compartment is provided with a vent by which to alleviate temperature and/or pressure problems and allow escape of moisture which might otherwise collect in the unit. These and other objects and advantages of the invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

FIG. 1 is a diagrammatic view of a vehicle equipped with a remote radar detector having a receiver unit, alert unit and vented cable in accordance with the principles of the present invention;

FIG. 2 is a perspective view of the units and vented cable of FIG. 1;

FIG. 3 is cross-sectional view of the receiver unit taken on line 3—3 of FIG. 2;

FIG. 4 is a cross-sectional view of the vented cable taken on line 4—4 of FIG. 3; and FIG. 5 is a cross-sectional view of the vented cable and connectors taken on line 5—5 of FIG. 2.

DETAILED DESCRIPTION OF THE DRAWINGS

With reference to FIG. 1, there is shown a remote radar detector 10 comprised of a receiver unit 12, an alert unit 14, and a cable 16 adapted to be mounted to a representative vehicle 20. Receiver unit 12 is mounted exteriorly of the vehicle passenger compartment 22, such as near the engine compartment 23 of vehicle 20. Advantageously, unit 12 is mounted under the hood 24 and behind grille 25 of vehicle 20. Receiver unit 12 may include the microwave and laser detectors (antennae) and one or more of the RF, IF and primary digital processor circuits (all not shown) to detect police microwave and/or laser radar signals, and output on cable 16 digital signals indicative of receipt thereof.

Alert unit 14 is mounted remote from receiver unit 12 and, advantageously, inside vehicle passenger compartment 22, such as along dashboard 30 or steering wheel column 32, as desired. Alert unit 14 may include secondary processor circuitry (not shown) to analyze the digital signals from cable 16, and appropriate audible and visual alert indicators to provide warnings to the driver (not shown) as to the type and strength of police radar signal detected at receiving unit 12, as is conventional. To this end, cable 16 extends (as a single cable or as multiple cable segments or portions) from unit 12, through engine compartment 23 and firewall 33 thereof, to electrically connect directly, or indirectly through a junction box with a further segment of cable (both not shown), to alert unit 14. Where a junction box is used, the junction box may also couple to the car battery via a separate cable (not shown) so as to power units 12 and 14 via cable 16. Cable 16 thus includes a plurality of insulated conductors 40 electrically connecting the circuitry inside receiver unit 12 and the circuitry inside alert unit 14 so as to convey the digital signals from receiver unit 12 to alert unit 14.

Receiver unit 12 is advantageously defined within a housing 50 which contains all of the necessary circuitry (not shown), and is hermetically sealed in an effort to prevent environmental contaminants from entering the housing. As seen in FIGS. 2 and 3, housing 50 may comprise upper and lower plastic shells 52, 54 with a sealing gasket 56 therebetween, and secured in hermetically sealed relationship such as with screws 58 or the like. Shells 52 and 54 are transparent to microwave and infrared police radar signals so as to allow police radar signals to pass into housing 50 for detection thereby. Shell 54 may include on a sidewall thereof a polished portion (not shown) to better transmit laser police radar signals.

In order to alleviate temperature, pressure or moisture problems that might otherwise affect operation of receiver unit 12, cable 16 includes one or more airspaces 62 (FIG. 4), individually and collectively referred to herein as a lumen, extending therethrough. Lumen 62 may be provided by the air gaps between conductors 40 within cable 16 or by a specific passageway, such as a void conductor space, extending through cable 16. Lumen 62 opens at the distal end 64 of cable 16 inside housing 50 as at 66 so as to couple the interior space 68 of housing 50 into lumen 62. Cable 16 extends into housing 50 through a grommet or bushing 70 (which may be integrated with gasket 56) which is sealed with glue or caulk such that unit 50 is hennetically sealed except for airspace 62 of cable 16. Lumen 62 couples to a vent or opening 75 remote from unit 12 by which to communicate atmosphere to housing interior 68 via lumen 62. Vent 75 may be provided by an opening or slit extending through a portion of the sidewall 76 of cable 16.

In one embodiment, cable 16 may include at least two cable segments or portions 16a and 16b as will now be described with further reference to FIG. 5. Cable portion 16a defines distal end 64 of cable 16 and terminates proximally in first in-line connector 80. Connector 80 has a connector body 81 supporting a plurality of sockets 82 coupled to conductors 40a of cable portion 16a. An air hole 84 is formed or drilled in connector body 81, such as in the center of face 85 and between sockets 82 so as to communicate with, and provide an airway continuation of, lumen 62a extending through cable portion 16a. Cable portion 16b has a second connector 86 with a connector body 87 supporting a plurality of pins 88. Connector body 87 is designed to mechanically engage with connector body 81 so as to electrically interconnect sockets 82 with pins 88 and thereby electrically couple conductors 40a of cable portion 16a with conductors 40b of cable portion 16b. Connector body 87, like connector body 81, is advantageously provided with a formed or drilled airhole 90 in face 91 to continue lumen 62b extending into cable portion 16b. With connector bodies 81, 87 mechanically mated together, airholes 84 and 90 align such that lumens 62a and 62b communicate through airholes 84 and 90 so as to define, in effect, a continuous airspace 62.

Cable portion 16a may be entirely outside of vehicle passenger compartment 22, with cable portion 16b connecting to cable portion 16a via connectors 80 and 86 inside the engine compartment 23, and extending proximally away from cable portion 16a into vehicle passenger compartment 22 for connection to alert unit 14, or at least a junction box (not shown). Vent 75 may be formed in an area 92 of cable portion 16b within passenger compartment 22, such as by a slit 94 formed therein. Where conductors 40 are to be interconnected, area 92 of cable portion 16b may first be exposed, and conductors 40 then interconnected as desired. A heat shrinkable polyolefin, adhesive-lined tube or sleeve 95 may then be placed over area 92, provided with slit 94, and heat shrunk to reseal cable portion 16b, but with vent 75 defined by slit 94 in sleeve 95, the latter of which now defines part of sidewall 76 of cable 16. Alternatively, a tube (not shown) could be heat shrunk into place between sleeve 95 and cable sidewall 76 to provide the vent. In any event, it will be appreciated that vent 75 is advantageously positioned sufficiently remote from distal end 64 and unit 12 as to be positioned inside vehicle passenger compartment 22.

In use, receiver unit 12 is mounted to vehicle 20 exteriorly of vehicle passenger compartment 22, and alert unit 14 is mounted within compartment 22, such as in a discreet location. Cable portions 16a, 16b are connected together to electrically interconnects units 12 and 14 and, via lumen 62 and vent 75, provide venting of otherwise hermetically sealed housing 50 of unit 12.

By virtue of the foregoing, there is thus provided a remote radar detector in which the hermetically sealed receiver unit to be mounted outside the vehicle passenger compartment is provided with a vent by which to alleviate temperature or pressure problems and allow escape of moisture which might otherwise collect in the hermetically sealed unit.

While the present invention has been illustrated by the description of embodiments thereof, and while the embodiments have been described in considerable detail, it is not intended to restrict or in any way limit the scope of the appended claims to such detail. Additional advantages and modifications will readily appear to those skilled in the art. For example, receiver unit 12 may include only the antennae and, possibly, RF circuitry, while the remaining circuitry, including IF circuitry and primary processing circuitry, is contained within alert unit 14, or an intermediate unit (not shown) between units 12 and 14. In the latter event, the vented cable may need to extend only between unit 12 and the intermediate unit (which for purposes herein may be considered the alert unit). Also, while units 12 and 14 are shown as electrically communicating via cable 16, they could electrically communicate in other ways, such as optically or by RF means. In that event, cable 16 may dispense with conductors 40, and may need to extend only from unit 12 and into passenger compartment 22, although not all the way to alert unit 14 (or a junction box), so as to continue to vent receiver unit 12 into passenger compartment 22. Moreover, while vent 75 is shown remote from unit 12, and spaced from unit 14, lumen 62 could extend into alert unit 14 so as to define a vent by the proximal end of cable 16 that terminates into alert unit 14. The invention in its broader aspects is, therefore, not limited to the specific details, representative apparatus and method, and illustrative example shown and described. Accordingly, departures may be made from such details without departing from the spirit or scope of the general inventive concept.

Having described the invention, what is claimed is:

1. A remote radar detector comprising:

a receiver unit adapted to be positioned outside a passenger compartment of a vehicle;

a cable connected to the receiver unit for communicating electrical signals between the receiver unit and an alert unit adapted to be located remote from the receiver unit, the cable including a lumen extending within the cable and communicating into the interior of the receiver unit; and a vent communicating with the lumen, the vent being positioned remote from the receiver unit.

2. The remote radar detector of claim 1 further comprising an alert unit adapted to be mounted inside said passenger compartment and being coupled to the cable.

3. The remote radar detector of claim 2, the vent being spaced from the alert unit.

4. The remote radar detector of claim 1, the receiver unit being hermetically sealed.

5. The remote radar detector of claim 1, the cable including two cable portions, each with a respective portion of the lumen extending therethrough, the cable portions being joined with the respective lumen portions communicating with each other.

6. The remote radar detector of claim 5, each cable portion having a connector associated therewith, the connectors adapted to mate together to join the cable portions, each connector having an airhole communicating with the respective lumen portion of the associated cable portion, whereby the respective lumen portions of the cable portions communicate via the connectors.

7. The remote radar detector of claim 1, the cable including a plurality of conductors extending therethrough, the lumen including an airspace between the conductors.

8. The remote radar detector of claim 1, the vent being formed in a sidewall of the cable.

9. A remote radar detector comprising:
   a receiver unit adapted to be positioned outside a passenger compartment of a vehicle;
   a cable connected to the receiver unit and including a lumen extending within the cable and communicating into the interior of the receiver unit; and
   a vent communicating with the lumen, the vent being positioned remote from the receiver unit.

10. The remote radar detector of claim 9, the cable having a distal end at the receiver unit, the vent being positioned along the cable and spaced from a proximal end thereof.

11. The remote radar detector of claim 9, the receiver unit being hermetically sealed.

12. The remote radar detector of claim 9, the cable including two cable portions, each with a respective portion of the lumen extending therethrough, the cable portions being joined with the respective lumen portions communicating with each other.

13. The remote radar detector of claim 12, each cable portion having a connector associated therewith, the connectors adapted to mate together to join the cable portions, each connector having an airhole communicating with the respective lumen portion of the associated cable portion, whereby the respective lumen portions of the cable portions communicate via the connectors.

14. The remote radar detector of claim 9, the cable including a plurality of conductors extending therethrough, the lumen including an airspace between the conductors.

15. The remote radar detector of claim 9, the vent being formed in a sidewall of the cable.

16. A vehicle having a passenger compartment, in combination with a remote radar detector mounted to the vehicle, the remote radar detector including a receiver unit mounted to the vehicle outside the passenger compartment; an alert unit mounted inside the passenger compartment; and a cable electrically connected to the receiver unit and the alert unit for communicating electrical signals therebetween, the cable having a lumen extending within the cable and communicating into the interior of the receiver unit, and a vent communicating with the lumen, the vent being positioned remote from the receiver unit.

17. The vehicle and remote radar detector combination of claim 16, the vent being positioned inside the vehicle passenger compartment.

18. The vehicle and remote radar detector combination of claim 16, the vent being positioned along the cable and spaced from the alert unit.

19. The vehicle and remote radar detector combination of claim 16, the receiver unit being hermetically sealed.

20. The vehicle and remote radar detector combination of claim 16, the cable including two cable portions, each with a respective portion of the lumen extending therethrough, the cable portions being joined with the respective lumen portions communicating with each other.

21. The vehicle and remote radar detector combination of claim 20, each cable portion having a connector associated therewith, the connectors adapted to mate together to join the cable portions, each connector having an airhole communicating with the respective lumen portion of the associated cable portion, whereby the respective lumen portions of the cable portions communicate via the connectors.

22. The vehicle and remote radar detector combination of claim 21, the connectors being exteriorly of the passenger vehicle compartment.

23. The vehicle and remote radar detector combination of claim 16, the cable including a plurality of conductors extending therethrough, the lumen including an airspace between the conductors.

24. The vehicle and remote radar detector combination of claim 16, the vent being formed in a sidewall of the cable.

25. A method of venting a receiver unit of a remote radar detector comprising:
   coupling a cable to the receiver unit, the cable having a lumen extending therethrough; and
   forming a vent to the lumen remote from the receiver unit.

26. The method of claim 25 further comprising mounting the receiver unit to a vehicle outside the passenger compartment thereof and positioning the vent in the passenger compartment.

27. The method of claim 25 further comprising forming the vent by slitting a sidewall of the cable.

28. The method of claim 27 further comprising positioning a sleeve over a portion of the cable, and forming the vent by slitting the sleeve.

* * * * *